(12) United States Patent
Fukugami et al.

(10) Patent No.: US 12,269,241 B2
(45) Date of Patent: Apr. 8, 2025

(54) GAS BARRIER FILM

(71) Applicant: TOPPAN INC., Tokyo (JP)

(72) Inventors: Miki Fukugami, Tokyo (JP); Kaoru Furuta, Tokyo (JP)

(73) Assignee: TOPPAN INC., Tokyo (JP)

( * ) Notice: Subject to any disclaimer, the term of this patent is extended or adjusted under 35 U.S.C. 154(b) by 351 days.

(21) Appl. No.: 17/973,694

(22) Filed: Oct. 26, 2022

(65) Prior Publication Data

US 2023/0053232 A1 Feb. 16, 2023

Related U.S. Application Data

(63) Continuation of application No. PCT/JP2021/016307, filed on Apr. 22, 2021.

(30) Foreign Application Priority Data

Apr. 28, 2020 (JP) ................. 2020-079516

(51) Int. Cl.
*B32B 27/08* (2006.01)
*B32B 1/08* (2006.01)
(Continued)

(52) U.S. Cl.
CPC ............ *B32B 27/08* (2013.01); *B32B 1/08* (2013.01); *B32B 27/32* (2013.01); *B65D 65/40* (2013.01); *B32B 2250/02* (2013.01); *B32B 2250/246* (2013.01); *B32B 2255/10* (2013.01); *B32B 2255/20* (2013.01); *B32B 2255/26* (2013.01);
(Continued)

(58) Field of Classification Search
CPC .......... B32B 27/08; B32B 1/08; B32B 27/32; B32B 2250/02; B32B 2250/246; B32B 2255/10; B32B 2255/20; B32B 2255/26; B32B 2255/28; B32B 2307/7242; B32B 2307/7244; B32B 2311/24; B32B 2323/10; B32B 2383/00; B32B 2439/46; B32B 2439/70; B32B 2250/242; B32B 2270/00; B32B 2307/732; B32B 2439/06; C09D 183/02; C09D 183/06; C08G 77/02; C08G 77/14; B65D 65/40; B65D 35/08; B65D 75/5883; Y02W 30/80
See application file for complete search history.

(56) References Cited

FOREIGN PATENT DOCUMENTS

JP 63-290743 A 11/1988
JP 63-291929 A 11/1988
(Continued)

OTHER PUBLICATIONS

Machine Translation of JPH09290477A (Year: 1997).*
(Continued)

*Primary Examiner* — James C Yager
(74) *Attorney, Agent, or Firm* — Foley & Lardner LLP

(57) ABSTRACT

A gas barrier film including: a substrate layer containing polypropylene; a resin layer containing a copolymer of propylene and another monomer; a vapor deposition layer of an inorganic oxide; and a gas barrier layer, laminated in this order, wherein the vapor deposition layer has a thickness of 5 nm to 300 nm, the resin layer has a thickness of 0.3 μm or more, and a surface of the resin layer facing the vapor deposition layer has at least one softening temperature in a range of 100° C. to 170° C. when measured by local thermal analysis (LTA).

7 Claims, 3 Drawing Sheets

(51) Int. Cl.
   *B32B 27/32*   (2006.01)
   *B65D 65/40*   (2006.01)

(52) U.S. Cl.
   CPC ... *B32B 2255/28* (2013.01); *B32B 2307/7242* (2013.01); *B32B 2307/7244* (2013.01); *B32B 2311/24* (2013.01); *B32B 2323/10* (2013.01); *B32B 2383/00* (2013.01); *B32B 2439/46* (2013.01); *B32B 2439/70* (2013.01)

(56) References Cited

FOREIGN PATENT DOCUMENTS

| JP | 07-329258 A | 12/1995 |
| JP | 09-290477 A | 11/1997 |
| JP | 11-099587 A | 4/1999 |
| JP | 2969657 B2 | 11/1999 |

OTHER PUBLICATIONS

Ohnishi et al. "X-ray Reflectance Measurement Device Using a Small White X-ray Tube", Adv. X-Ray Chem. Anal., Mar. 31, 2014, pp. 211-215.

International Searching Authority, "International Search Report," issued in connection with International Patent Application No. PCT/JP2021/016307, dated Jul. 7, 2021.

International Searching Authority, "Written Opinion," issued in connection with International Patent Application No. PCT/JP2021/016307, dated Jul. 7, 2021.

\* cited by examiner

GAS BARRIER FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/016307, filed on Apr. 22, 2021, which in turn claims the benefit of JP 2020-079516, filed Apr. 28, 2020 the disclosures of all which are incorporated herein by reference in its entirety.

TECHNICAL FIELD

The present invention relates to a gas barrier film, and more specifically to a gas barrier film having improved resistance to heat sterilization such as boiling treatment and retort treatment.

BACKGROUND

Gas barrier films are widely used mainly as packaging materials for foods and pharmaceuticals, and subjected to heat sterilization such as boiling treatment and retort treatment. In packaging of these contents, it has been particularly important to reduce oxygen permeability. For such barrier films used as packaging materials subjected to heat sterilization, a polyethylene terephthalate film having high heat resistance is typically used as a substrate.

In recent years, however, with an increase in awareness of environmental issues, there has been an increasing interest in packaging materials using a single material, called mono-material packaging materials, which are suitable for recycling. Since an olefin-based film such as polypropylene is typically used as a film of packaging materials, it is required to use polypropylene as a substrate for a gas barrier film in order to produce a mono-material packaging material using such a film.

Polypropylene films are widely used as packaging materials due to their excellent transparency, mechanical strength, and heat resistance. However, unlike polyethylene terephthalate and the like, polypropylene does not have sufficient metal deposition capability, adhesiveness to other resins, and secondary processability such as printability. In order to solve such issues, various methods have been proposed. For example, PTL 1 proposes a method of blending ethylene-α-olefin copolymer with a polypropylene film, and PTLs 2 and 3 propose a method of laminating an ethylene-α-olefin copolymer, or the like.

[Citation List] [Patent Literature] PTL 1: JP S63-291929 A; PTL 2: JP S63-290743 A; PTL 3: JP 2969657 B.

SUMMARY OF THE INVENTION

Problem to be Solved by the Invention

However, it has been found that the conventional gas barrier film cannot maintain oxygen permeability at a low level after heat sterilization treatment.

The present invention has been made in view of the above circumstances, and aims to provide a gas barrier film capable of maintaining oxygen permeability at a low level even after heat sterilization treatment.

Solution to Problem

The present invention relates to a gas barrier film including: a substrate layer containing polypropylene; a resin layer containing a copolymer of propylene and another monomer; a vapor deposition layer of an inorganic oxide; and a gas barrier layer, laminated in this order, wherein the vapor deposition layer has a thickness of 5 nm to 300 nm, the resin layer has a thickness of 0.3 µm or more, and a surface of the resin layer facing the vapor deposition layer has at least one softening temperature in a range of 100° C. to 170° C. when measured by local thermal analysis (LTA).

The resin layer may contain a copolymer of propylene and α-olefin.

The resin layer may have a thickness of 2.0 µm or less.

The vapor deposition layer may contain at least one selected from the group consisting of aluminum oxide and silicon oxide.

The gas barrier layer may be formed of a coating solution containing at least one silicon compound selected from the group consisting of $Si(OR^1)_4$ and $R^2Si(OR^3)_3$ ($OR^1$ and $OR^3$ are independently hydrolysable groups, and $R^2$ is an organic functional group) or a hydrolysate thereof, and a water soluble polymer having a hydroxyl group.

Further, the present invention provides a packaging bag including the gas barrier film according to the present invention.

Further, the present invention provides a tube container including the gas barrier film according to the present invention.

Advantageous Effects of the Invention

According to the present invention, a gas barrier film capable of maintaining oxygen permeability at a low level even after heat sterilization treatment can be provided.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

<Gas Barrier Film>

Figure 1:
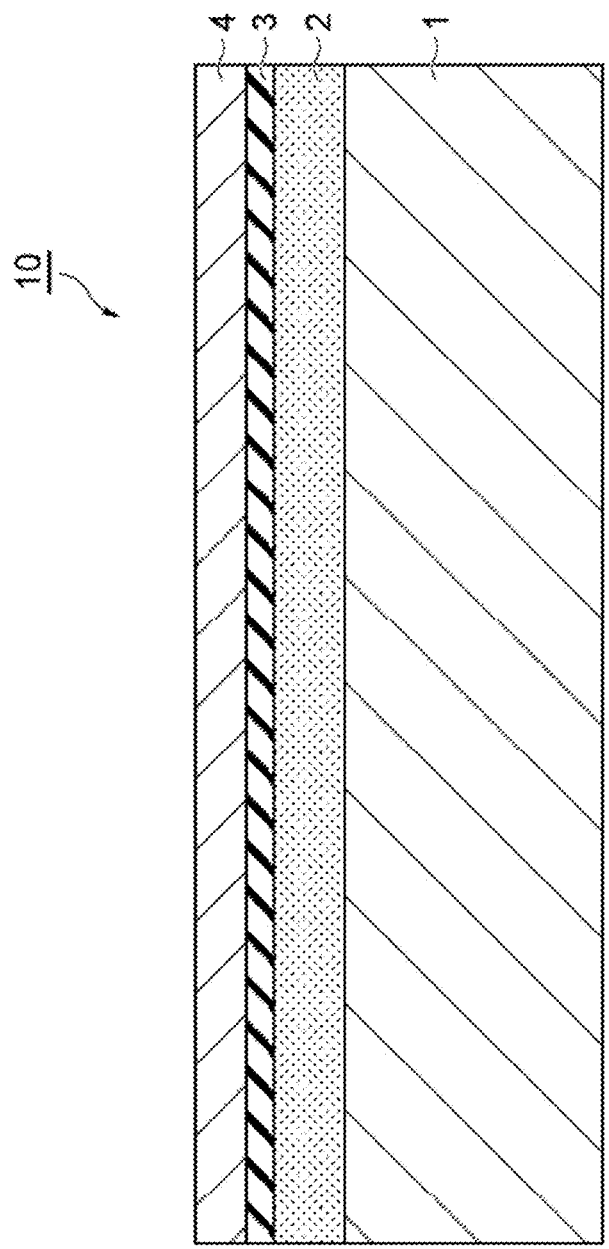
FIG. 1 is a schematic cross-sectional view illustrating a gas barrier film according to an embodiment of the present invention.

FIG. 1 is a schematic cross-sectional view illustrating a gas barrier film according to an embodiment. As shown in FIG. 1, a gas barrier film 10 according to the present embodiment includes a substrate layer 1, a resin layer 2, a vapor deposition layer 3, and a gas barrier layer 4 laminated in this order.

[Substrate Layer]

The substrate layer is a film (base film) serving as a support and contains polypropylene. The polypropylene may be crystalline polypropylene, and, from the perspective of further improving heat resistance for heat sterilization, homopolypropylene which is a homopolymer of propylene is preferably used. However, as long as the effect of the present invention is not significantly impaired, a random copolymer of propylene and α-olefin or a mixture of the copolymer and homopolypropylene may be used.

The substrate layer may be a film made of polypropylene, or may be a film obtained by preparing a polypropylene sheet and stretching the sheet by conventional means to form a uniaxial or biaxial film. Known additives such as antioxidants, stabilizers, lubricants such as calcium stearate, fatty acid amides and erucid acid amides, organic additives such as antistatic agents, and inorganic additives such as particulate lubricants such as silica, zeolite, Syloid, hydrotalcite and silicon particles may be added to the substrate layer as appropriate.

The thickness of the substrate layer may be, for example, 3 μm or more and 200 μm or less, preferably 6 μm or more and 50 μm or less, but is not limited thereto.

[Resin Layer]

The resin layer contains a copolymer of propylene and another monomer. When heat sterilization is performed, the substrate layer undergoes shrinkage due to heat. If a barrier film is formed by laminating a vapor deposition layer directly on the substrate layer, the vapor deposition layer is damaged by the shrinkage of the substrate layer during heat sterilization, causing barrier deterioration. On the other hand, the present invention, in which a resin layer is provided, can mitigate stress due to shrinkage applied to the vapor deposition layer, and as a result the vapor deposition layer is less likely to be damaged.

The resin layer may be made of a copolymer of propylene and another monomer. Examples of another monomer include α-olefins such as ethylene, 1-butene, 1-hexene, and the like.

In the resin layer, a surface facing the vapor deposition layer is required to have at least one softening temperature in the range of 100° C. to 170° C. The softening temperature is a temperature value obtained by local thermal analysis (LTA), and an index indicating the softening behavior. For evaluation of the softening temperature, an atomic force microscope having a nanothermal microscope composed of a cantilever with a heating mechanism is used. While the cantilever is in contact with a surface of a sample fixed on a sample stage, a constant force (contact force) is applied to the cantilever in a contact mode, and a voltage is applied to heat the cantilever. Accordingly, the surface of the sample thermally expands and lifts the cantilever. When the cantilever is further heated, the surface of the sample softens, causing a significant change in hardness. As a result, the cantilever is lowered into the sample surface. The rapid change in position at this time is detected. The change point in voltage is the softening point, and the softening temperature is calculated by converting the voltage into a temperature. By performing such measurement, the softening temperature in a local nanoscale region near the surface can be obtained.

As the atomic force microscope (AFM), an MPF-3D-SA (trade name) and Ztherm system (trade name) manufactured by Oxford Instruments Inc. can be used. The device is not particularly limited, and the Nano Thermal Analysis (trade name) series and nano IR (trade name) series manufactured by Bruker Japan K.K. can also be used for measurement. In addition, it is also possible to perform measurement by attaching Nano Thermal Analysis (trade name) to an AFM of other manufacturers.

As the cantilever, an AN2-200 (trade name) manufactured by Anasys Instruments Inc. is used. The cantilever is not particularly limited, and other cantilevers can also be used as long as they can sufficiently reflect laser light and apply a voltage.

The voltage range applied to the cantilever depends on the resin to be measured, but is preferably 1V to 10V, and more preferably 3V to 8V for measurement with less damage to the sample and higher spatial resolution.

The measurable softening temperature range depends on the resin or the like to be measured, but typically, can range from room temperature such as approximately 25° C. as a measurement start temperature to approximately 400° C. as a measurement end temperature. The temperature range for calculating the softening temperature is preferably 25° C. or more and 300° C. or less.

In measurement of the softening temperature, heat is applied to the cantilever while applying a constant contact force. The contact force should be a force that causes contact with the sample but does not damage the surface. The cantilever preferably has a spring constant of 0.1 N/m to 3.5 N/m, and in order to perform measurement in both tapping mode and contact mode, it is preferred to use a cantilever having a spring constant of 0.5 N/m to 3.5 N/m. The contact force is preferably 0.1 V to 3.0 V.

The heating rate of the cantilever depends on the heating mechanism or the like of the cantilever, but is preferably 0.1 V/sec or more and 10 V/sec or less in general. More preferably, the heating rate is 0.2 V/sec or more and 5 V/sec or less. As the surface of the sample softens, the cantilever enters the sample, whereby the needle is lowered. The depth that the cantilever enters the sample is preferably 3 nm to 500 nm so that the peak top of the softening curve can be recognized. The depth is more preferably 5 nm to 100 nm since the cantilever may be broken if it enters the sample deeply.

Although not limited thereto, a softening point or a softening temperature may also be obtained by approximating each of an expansion curve and a softening curve by an appropriate function and calculating an intersection of them. Alternatively, an analysis method in which the peak top of the displacement is regarded as a softening point or a softening temperature may also be used. The displacement may be from a steady state to a predetermined value in expansion or softening.

In order to measure the accurate temperature of the sample, a calibration curve may be prepared after the sample is measured. As calibration samples, four types, i.e., polycaprolactone (melting point: 55° C.), low density polyethylene (LDPE, melting point: 110° C.), polypropylene (PP, melting point: 164° C.), and polyethylene terephthalate (PET, melting point: 235° C.), may be used. Two measurements are performed at different measurement positions, and a calibration curve is prepared by using the average of these measurements as a surface softening temperature. In this calibration curve, the voltage is taken as a softening point, which is converted into the temperature to obtain a softening temperature.

When the softening temperature is 100° C. or higher, the heat resistance is prevented from becoming too low. Accordingly, a decrease in adhesion and deterioration of the barrier due to softening during heat sterilization are less likely to occur. Further, when the temperature is 150° C. or lower, the surface layer is prevented from becoming too hard, reducing the stress to other layers during lamination or the like. Accordingly, damage to the barrier layer and deterioration of the barrier are less likely to occur. From these viewpoints, the softening temperature is preferably 105° C. or higher, and preferably 145° C. or lower, and more preferably 140° C. or lower.

In the copolymer of propylene and another monomer, the content of another monomer in the copolymer is preferably 2 mol % to 10 mol %, and more preferably 3 mol % to 6 mol %. When the content of another monomer in the copolymer is 2 mol % or more, adhesion to the vapor deposition layer can be further sufficiently ensured. Further, at 10 mol % or less, the heat resistance of the resin layer can be sufficiently ensured, suppressing a decrease in adhesion during heat sterilization.

The resin layer has a thickness of 0.3 μm or more. When the thickness is 0.3 μm or more, uniform lamination can be achieved while preventing variation in thickness. Further, it is considered that the stress to the vapor deposition layer during heat sterilization can be sufficiently reduced, and deterioration of the barrier can be suppressed. From these viewpoints, the resin layer preferably has a thickness of 0.5 μm or more. On the other hand, the upper limit of the thickness of the resin layer is not particularly limited, but from the perspective of further ensuring heat resistance of the entire substrate, it is preferably 2.0 μm or less, and more preferably 1.8 μm or less.

The polypropylene or copolymer of polypropylene and another monomer used for the substrate layer and the resin layer may be a recycled resin or a resin obtained by polymerizing a raw material derived from biomass such as plants. Such resins can be used singly or as a mixture with a resin polymerized with conventional fossil fuels.

[Vapor Deposition Layer]

The vapor deposition layer is disposed on the resin layer from the perspective of, for example, improving gas barrier properties against water vapor or oxygen, and is preferably transparent. The vapor deposition layer contains an inorganic oxide. Examples of the inorganic oxide include aluminum oxide, silicon oxide, tin oxide, magnesium oxide and a mixture thereof. Among these, it is particularly preferred to use at least one selected from the group consisting of aluminum oxide and silicon oxide in consideration of various sterilization resistances.

The vapor deposition layer of the inorganic oxide has a thickness of 5 nm to 300 nm. When the thickness of the vapor deposition layer is 5 nm or more, a film with a uniform and sufficient thickness can be easily formed, and the function as a gas barrier film can be sufficiently performed. Further, when the thickness of the vapor deposition layer is 300 nm or less, the vapor deposition layer can be provided with flexibility, preventing occurrence of cracking in the vapor deposition layer even if external factors such as bending and tension are applied after the film is formed. From these viewpoints, the thickness of the vapor deposition layer is preferably 6 nm or more and 150 nm or less, and more preferably 100 nm or less.

The vapor deposition layer can be formed by a conventional vacuum deposition method. Alternatively, other thin film formation methods such as sputtering, ion plating and plasma-enhanced chemical vapor deposition (CVD) can be used. In view of productivity, vacuum vapor deposition is currently most preferable. As a heating means for the vacuum vapor deposition, it is preferred to use one of electron beam heating, resistive heating, and inductive heating, but considering a wide range of selectivity of the evaporative materials, electron beam heating is more preferably used. Further, in order to enhance adhesion between the vapor deposition layer and the resin layer and improve the density of the vapor deposition layer, vapor deposition may also be performed using a plasma assisted method or an ion beam assisted method. Moreover, in order to improve transparency of the vapor deposition film, reactive deposition in which various gases such as oxygen are supplied may be performed during vapor deposition.

In order to improve adhesion between the resin layer and the vapor deposition layer, a surface of the resin layer facing the vapor deposition layer may be subjected to treatment such as plasma treatment or corona treatment, or an anchor coat layer may be provided between the resin layer and the vapor deposition layer. Providing an anchor coat layer can further improve adhesion, barrier properties, and the like after heat sterilization. Examples of a coating agent for providing an anchor coat layer include acrylic resin, epoxy resin, acrylic urethane-based resin, polyester-based polyurethane resin, polyether-based polyurethane resin, and the like. Among these coating agents, acrylic urethane resin and polyester-based polyurethane resin are preferred from the viewpoint of heat resistance and interlayer adhesion strength.

[Gas Barrier Layer]

The gas barrier layer is provided for protecting the vapor deposition layer and complementing the barrier properties. The gas barrier layer may be formed of a coating solution containing a silicon compound or a hydrolysate thereof, and a water soluble polymer having a hydroxyl group.

Examples of the water soluble polymer having a hydroxyl group may include polyvinyl alcohol, polyvinyl pyrrolidone, starch, methyl cellulose, carboxymethyl cellulose, sodium alginate, and the like. In particular, polyvinyl alcohol (PVA)

is preferably used for a coating agent due to particularly excellent gas barrier properties.

Examples of the silicon compound preferably include at least one selected from the group consisting of $Si(OR^1)_4$ and $R^2Si(OR^3)_3$ ($OR^1$ and $OR^3$ are independently hydrolysable groups, and $R^2$ is an organic functional group). $Si(OR^1)_4$ is preferably tetraethoxysilane $[Si(OC_2H_5)_4]$. Tetraethoxysilane is preferably used since it is relatively stable in an aqueous solvent after hydrolysis. Further, $R^2$ in $R^2Si(OR^3)_3$ is preferably selected from the group consisting of a vinyl group, an epoxy group, a methacryloxy group, a ureido group, and an isocyanate group.

The gas barrier layer is formed by mixing a solution in which a water soluble polymer is dissolved in water or water/alcohol mixture solvent with a silicon compound directly or hydrolyzed in advance, and applying the mixed solution to the vapor deposition layer, followed by heating and drying. The solution may further contain, as necessary, isocyanate compounds, silane coupling agents, or known additives such as a dispersant, a stabilizer, a viscosity modifier and a colorant to such an extent that the gas barrier properties are not impaired.

When PVA is used as the water soluble polymer, the PVA content in the mixed solution is preferably 20 mass % or more and 50 mass % or less, and more preferably 25 mass % or more and 40 mass % or less, relative to the total solid content of the mixed solution. When the PVA content is 20 mass % or more, the flexibility of the film can be maintained, which facilitates formation of the gas barrier layer. On the other hand, when the PVA content is 50 mass % or less, sufficient gas barrier properties can be imparted to the gas barrier film.

<Packaging Bag>

A packaging bag according to the present embodiment can be obtained by producing a packaging material by laminating a sealant layer on the above gas barrier film via an adhesive layer, and forming the packaging material into a bag shape. The sealant layer may be made of, for example, a stretched or unstretched polypropylene film. The thickness of the sealant layer may be, for example, 20 μm or more and 200 μm or less, but is not limited thereto.

The adhesive layer bonds the gas barrier film to the sealant layer. Examples of the adhesive constituting the adhesive layer include a polyurethane resin obtained by reacting a bifunctional or higher functional isocyanate compound with a base resin such as a polyester polyol, polyether polyol, acrylic polyol, carbonate polyol, or the like. The various polyols may be used singly or in combination of two or more. In order to promote adhesion of the adhesive layer, a carbodiimide compound, an oxazoline compound, an epoxy compound, a phosphorus compound, a silane coupling agent, or the like may be added to the above polyurethane resin. The coating amount of the adhesive layer may be, for example, 0.5 g/m² to 10 g/m² from the perspective of obtaining desired adhesive strength, conformability, processability, and the like. From the viewpoint of environmental consideration, a polymer component derived from biomass or a biodegradable polymer may be used for the adhesive layer. Further, an adhesive having barrier properties may be used for the adhesive layer.

The packaging bag may be formed by folding a single sheet of the packaging material in half with the sealant layer inside and then heat-sealing three sides to form a bag shape, or by overlapping two sheets of the packaging material with the sealant layer inside and then heat-sealing four sides to form a bag shape. The packaging bag can contain contents such as foods and pharmaceuticals. The packaging bag may have a shape with a bent portion (folded portion), such as a standing pouch. The packaging bag according to the present embodiment can maintain high gas barrier properties even when it has a shape with a bent portion.

Another form of the packaging bag includes a spouted packaging bag. The spouted packaging bag may have a structure in which a spout is sandwiched and fixed between two gas barrier films constituting the packaging bag, or a structure in which an opening is formed in one wall of the packaging bag and a pouring spout is adhered and fixed thereto. The pouring spout may be provided on the top of the packaging bag, the upper corner of the packaging bag, or the side or bottom of the packaging bag. When the contents are liquid or gel-like foods, a straw reaching the bottom of the container may be provided in addition to the pouring spout (spout assembly) so that the user can directly suck on the spout to suck out the contents.

Figure 2:
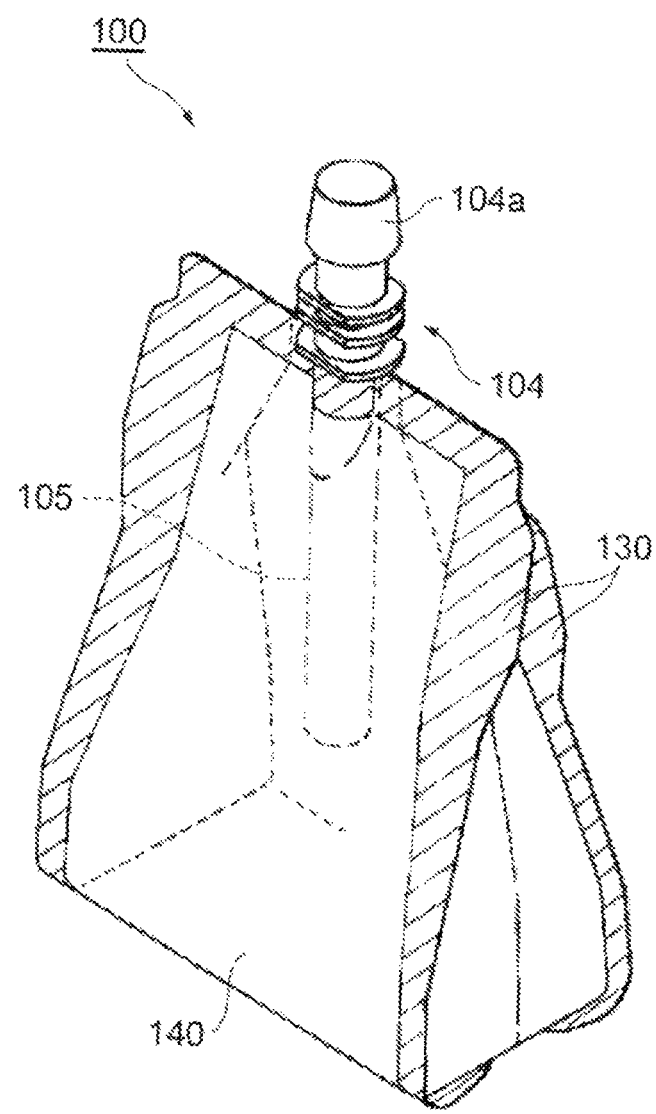
FIG. 2 is a perspective view illustrating an embodiment of a spouted packaging bag.

FIG. 2 is a perspective view illustrating an embodiment of a spouted packaging bag (gusset bag with a spout). A spouted packaging bag 100 shown in FIG. 2 has a structure in which a spout 104 is sandwiched between gas barrier films constituting a packaging bag 140 and fixed to a sealed portion 130, and the spout 104 is provided with a straw 105 reaching the bottom of the container. Further, the spouted packaging bag 100 is configured to be sealed by closing a spout cap 104a. The packaging bag 140 constituting the spouted packaging bag 100 may be a gusset bag that is able to stand alone due to the bottom being configured to expand when the bag is filled with the contents, with the lower part of the bag bulging.

Further, since the gas barrier film of the present embodiment includes the substrate layer containing polyolefin and the resin layer containing polyolefin, it is soft and maintains high gas barrier properties even after bending, which is suitable for use as a squeezable pouch. The squeezable pouch may be provided with a resealable spout, or may be configured as a single-use pouch in which a pouring spout is formed by tearing off the pouch.

Another form of the spouted packaging bag includes a bag-in-box in which a bag (inner bag) containing a liquid such as a soft drink or an alcoholic drink is accommodated in a carton (outer box). The gas barrier film of the present embodiment can be used as the above-mentioned bag for a bag-in-box, particularly as a main body of the bag having a pouring spout (tube).

In the case of any of the spouted packaging bags described above, it is preferred that the spout portion or the entire spout including the cap is made of the same resin as that of the substrate layer and the resin layer of the gas barrier film from the perspective of improving recyclability.

Further, the gas barrier film of the present embodiment can be used as a body of a tube container. The tube container typically includes a body formed of the gas barrier film and a spout unit prepared by extrusion molding. The spout unit is composed of a nozzle for discharging the contents and a shoulder for guiding the contents held in the body to the nozzle.

Figure 3:
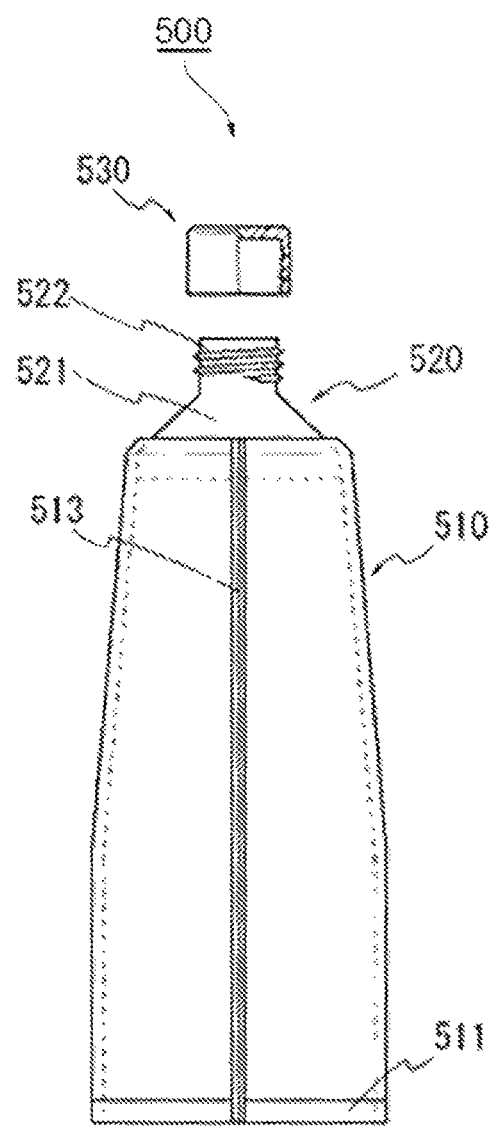
FIG. 3 is a front view illustrating an embodiment of a tube container.

FIG. 3 is a front view illustrating an embodiment of a tube container. A tube container 500 shown in FIG. 3 includes a body 510 formed of a gas barrier film, a spout unit 520 attached to a first end of the body 510, and a cap 530 detachably attached to the spout unit 520. The body 510 is a tubular member formed by bonding the sealant layers of the gas barrier films to each other at the sealed portion 513 and closing a bottom 511 located on a second end on a side opposite to the first end to which the spout unit 520 is attached, so that the body 510 can contain the contents. The spout unit 520 is composed of a nozzle 522 for discharging the contents and a shoulder 521 for guiding the contents held in the body 510 to the nozzle 522. The cap 530 is a member that openably closes the nozzle 522.

Since the gas barrier film of the present embodiment has gas barrier properties and maintain high gas barrier properties even after bending, it is suitable for use as the body of the tube container described above which is repeatedly subjected to bending or folding to squeeze out the contents. In a laminate tube which is one of the types of the tube container, the body may have a layer configuration which includes, from the innermost layer, a first resin layer (sealant layer), an adhesive layer, a metal oxide layer, an anchor coat layer, a substrate layer, an adhesive layer and a second resin layer (sealant layer), or, alternatively, a layer configuration which includes, from the innermost layer, a second resin layer (sealant layer), an adhesive layer, a substrate layer, an anchor coat layer, a metal oxide layer, an adhesive layer and a first resin layer (sealant layer). A print layer may be provided on one side of the second resin layer and bonded to the substrate via the adhesive layer, or may be provided on one side of the first resin layer and bonded to a metal oxide layer-forming surface of the substrate via the adhesive layer. Alternatively, the body of the tube container may have a configuration in which the first or second resin layer on the outermost side is not a sealant layer but is the same resin layer as the substrate layer which is not intended for heat sealing, and may be formed into a tubular shape by bonding the sealant layers on the innermost side to each other at the end (sealed portion) of the gas barrier film. In this case, in which the outermost layer does not need to be a sealant layer, high density polyethylene or polypropylene resin can be selected as a material of the outermost layer, enhancing the durability and aesthetic properties of the tube container. Further, since a sealant layer typically requires a thickness of 60 µm to 100 µm, the amount of plastic used in the entire container can be greatly reduced if a substrate (approximately 20 µm to 30 µm in thickness), instead of a sealant layer, can be used as the outermost layer. In a configuration in which the first resin layer on the innermost side is a sealant layer, the amount of plastic used in the entire tube container can be further reduced by using the substrate layer as the outermost layer and providing no second resin layer. In this case, a print layer may be formed on the substrate on the outermost side, and protected by an overprint varnish. Since a tube container having no sealant layer on the outermost side has a laminate thickness of the body smaller than that of a tube container having a sealant layer on both sides of the laminate, the stress applied to the gas barrier layer due to bending might seem to be relatively large. However, the laminate of the present invention, which has gas barrier properties and maintain high gas barrier properties even after bending, can be suitably used. For the shape of the tube container, the shoulder portion may be provided perpendicularly without providing a taper to the body portion, so that the contents can be completely squeezed out.

When the substrate layer and the sealant layer of the gas barrier film are made of the same resin, the recyclability can be improved. The material of the spout unit and the cap of the tube container is not particularly limited, but when it is the same resin as that of the substrate layer, the recyclability can be further improved. In order to prevent a tube container from being tampered with, an easy peel sealant film that closes the opening of the nozzle from the outside may be provided. The gas barrier film of the present embodiment can also be used as a sealing lid for the opening in combination with an easy peel sealant film.

EXAMPLES

The present invention will be described in more detail using the examples, but the present invention is not limited to these examples.

Example 1

A homopolypropylene resin and an ethylene-propylene random copolymer resin (ethylene content: 3.2 mol %) were co-extruded to form a laminate (total thickness: 20 µm) of a substrate layer containing homopolypropylene and a resin layer containing an ethylene-propylene random copolymer. Table 1 shows the thickness of the resin layer.

Subsequently, an acrylic primer solution was applied on the resin layer by gravure coating and dried to form a 0.1 µm-thick anchor coat layer. Then, a silicon oxide thin film was deposited at 30 nm thickness on the anchor coat layer by reactive vapor deposition using high-frequency excited ion plating in an oxygen atmosphere at reduced pressure to form a vapor deposition layer of an inorganic oxide. Further, a solution obtained by mixing the following liquid A, liquid B and liquid C at a mixing ratio (mass %) of 70/20/10 respectively was applied on the vapor deposition layer by gravure coating, dried at 80° C. for 20 seconds to form a 0.3 µm-thick gas barrier layer. Thus, a gas barrier film of Example 1 was obtained.

Liquid A: Hydrolyzed solution with a solid content of 5 mass % (equivalent to $SiO_2$) obtained by adding 72.1 g of hydrochloric acid (0.1 N) to 17.9 g of tetraethoxysilane (hereinafter, TEOS) and 10 g of methanol, and stirring the mixture for 30 minutes for hydrolysis Liquid B: Water/methanol solution containing 5 mass % of polyvinyl alcohol (water/methanol weight ratio=95/5)

Liquid C: Hydrolyzed solution obtained by gradually adding hydrochloric acid (1 N) to β-(3,4 epoxy cyclohexyl) trimethoxysilane and isopropyl alcohol (IPA solution), stirring the mixture for 30 minutes for hydrolysis, and then hydrolyzing the mixture with a water/IPA=1/1 solution to adjust to a solid content of 5 mass % (equivalent to $R^2Si(OH)_3$)

Example 2

A gas barrier film was obtained in the same manner as in Example 1 except that an ethylene-propylene random copolymer resin (ethylene content: 5.0 mol %) was used, and the thickness of the resin layer was modified as shown in Table 1.

Example 3

A gas barrier film was obtained in the same manner as in Example 1 except that an ethylene-1-butene-1-propylene random copolymer resin (ethylene content: 2.5 mol %, 1-butene content: 3.5 mol %) was used instead of the ethylene-propylene random copolymer resin, and the thickness of the resin layer was modified as shown in Table 1.

Example 4

A gas barrier film was obtained in the same manner as in Example 1 except that the thickness of the resin layer was modified as shown in Table 1.

Example 5

A gas barrier film was obtained in the same manner as in Example 1 except that an ethylene-propylene random copolymer resin (ethylene content: 1.0 mol %) was used, and the thickness of the resin layer was modified as shown in Table 1.

Comparative Example 1

A gas barrier film having no resin layer was obtained in the same manner as in Example 1 except that a homopolypropylene resin was used instead of the ethylene-propylene random copolymer resin.

Comparative Example 2

A gas barrier film was obtained in the same manner as in Example 1 except that an ethylene-1-butene-1-propylene random copolymer resin (ethylene content: 3.2 mol %, 1-butene content: 15 mol %) was used instead of the ethylene-propylene random copolymer resin, and the thickness of the resin layer was modified as shown in Table 1.

Comparative Example 3

A gas barrier film was obtained in the same manner as in Example 1 except that the thickness of the resin layer was modified as shown in Table 1.

Comparative Example 4

A gas barrier film was obtained in the same manner as in Example 1 except that the thickness of the resin layer was modified as shown in Table 1.

[Evaluation]

(Measurement of Softening Temperature)

The softening temperature of the resin layer was measured by the following method. The measurement may be performed on a surface of the resin layer before the vapor deposition layer of the inorganic oxide is laminated, or a cross-section prepared using a microtome after the vapor deposition layer is laminated. In Comparative Example 1, the softening temperature on a surface of the substrate layer was measured.

In measurement of the softening temperature, an MPF-3D-SA (trade name) and Ztherm system (trade name) manufactured by Oxford Instruments Inc. were used as an atomic force microscope (AFM), and an AN2-200 (trade name) with spring constant: 1.5 N/m manufactured by Anasys Instruments Inc. was used as a cantilever.

The cantilever was heated with a contact force of 0.2 V and a heating rate of 0.5 V/sec. As a result, the surface of the sample expanded due to heat and lifted the needle. As the cantilever was further heated, the surface softened and the needle lowered. The measurement ended when the cantilever entered the sample surface by 50 nm.

A calibration curve was prepared to measure the accurate temperature of the sample. As calibration samples, four types, i.e., polycaprolactone (melting point: 55° C.), low density polyethylene (LDPE, melting point: 110° C.), polypropylene (PP, melting point: 164° C.), and polyethylene terephthalate (PET, melting point: 235° C.), were used. Two measurements were performed at different measurement positions, and a calibration curve was prepared by using the average of these measurements as a surface softening temperature. A softening temperature was obtained by approximating each of an expansion curve and a softening curve and calculating an intersection of them. Table 1 shows the results.

(Measurement of Oxygen Permeability)

The gas barrier film prepared in the examples and comparative examples was laminated with a 60 μm-thick unstretched polypropylene film by dry lamination using a two-part curing type urethane-based adhesive to form a packaging material.

The obtained packaging material was formed into a pouch having sealed portions on four sides, and the pouch was filled with water as a content. Then, a retort sterilization treatment was performed at 120° C. for 30 minutes.

An oxygen permeability was measured for the pouch after the retort treatment. The oxygen permeability was measured under conditions of a temperature of 30° C. and a relative humidity of 70% by using an oxygen permeability analyzer (OXTRAN 2/20 manufactured by Modern Control Inc.). The measurement method was in accordance with JIS K-7126, method B (equal pressure method), ASTM D3985-81, and the measurements were expressed in units of [$cm^3$ (STP)/($m^2$·day·MPa·atm). Table 1 shows the results.

TABLE 1

| | Thickness of resin layer (μm) | Softening temperature (° C.) | Oxygen permeability ($cm^3$ (STP)/ $m^2$ · day · MPa · atm) |
|---|---|---|---|
| Example 1 | 0.7 | 130 | 0.6 |
| Example 2 | 1.8 | 116 | 1.2 |
| Example 3 | 1.2 | 108 | 1.4 |
| Example 4 | 0.3 | 135 | 1.0 |
| Example 5 | 0.7 | 165 | 0.7 |
| Comparative Example 1 | 0 | 214 | 5.2 |
| Comparative Example 2 | 1.2 | 95 | 3.7 |
| Comparative Example 3 | 0.2 | 227 | 3.5 |
| Comparative Example 4 | 3.0 | 133 | 2.5 |

INDUSTRIAL APPLICABILITY

The packaging bag using the gas barrier film according to the present invention can be used as a packaging material that is less likely to undergo barrier deterioration even after heat sterilization. Further, a gas barrier packaging material as a mono-material packaging material suitable for recyclability can be provided.

REFERENCE SIGNS LIST

1 . . . Substrate layer; 2 . . . Resin layer; 3 . . . Vapor deposition layer; 4 . . . Gas barrier layer; 10 . . . Gas barrier film; 100 . . . Spouted packaging bag; 104 . . . Spout; 105 . . . Straw; 140 . . . Packaging bag; 500 . . . Tube container; 510 . . . Body; 520 . . . Spout unit; 530 . . . Cap.

What is claimed is:

1. A gas barrier film, comprising:
a substrate layer containing polypropylene;
a resin layer containing a copolymer of propylene and another monomer;
a vapor deposition layer of an inorganic oxide; and
a gas barrier layer, laminated in this order, wherein
the vapor deposition layer has a thickness of 5 nm to 300 nm,
the resin layer has a thickness of 0.3 μm or more, and
a surface of the resin layer facing the vapor deposition layer has at least one softening temperature in a range of 100° C. to 170° C. when measured by local thermal analysis (LTA).

2. The gas barrier film of claim 1, wherein the resin layer contains a copolymer of propylene and α-olefin.

3. The gas barrier film of claim 1, wherein the resin layer has a thickness of 2.0 μm or less.

4. The gas barrier film of claim 1, wherein the vapor deposition layer contains at least one selected from the group consisting of aluminum oxide and silicon oxide.

5. The gas barrier film of claim 1, wherein
the gas barrier layer is formed of a coating solution containing at least one silicon compound selected from the group consisting of $Si(OR^1)_4$ and $R^2Si(OR^3)_3$ ($OR^1$ and $OR^3$ are independently hydrolysable groups, and $R^2$ is an organic functional group) or a hydrolysate thereof, and a water soluble polymer having a hydroxyl group.

6. A packaging bag comprising the gas barrier film of claim 1.

7. A tube container comprising the gas barrier film of claim 1.

* * * * *